United States Patent [19]
Burger

[11] Patent Number: 5,654,021
[45] Date of Patent: *Aug. 5, 1997

[54] PROCESS FOR PREPARING A FILLED STEAMED BAGEL PRODUCT

[76] Inventor: Alvin Burger, 7876 SW. 89th La., Miami, Fla. 33156

[ * ] Notice: The term of this patent shall not extend beyond the expiration date of Pat. No. 5,514,395.

[21] Appl. No.: 577,965

[22] Filed: Dec. 26, 1995

Related U.S. Application Data

[63] Continuation-in-part of Ser. No. 106,763, Aug. 16, 1993, Pat. No. 5,514,395, which is a continuation-in-part of Ser. No. 816,010, Dec. 31, 1991, Pat. No. 5,236,724.

[51] Int. Cl.$^6$ .................................................. A21D 13/00
[52] U.S. Cl. ...................... 426/94; 426/19; 426/21; 426/283; 426/499; 426/502; 426/549
[58] Field of Search ........................... 426/94, 19, 21, 426/549, 499, 275, 504, 61, 62, 502, 143, 138, 283

[56] References Cited

U.S. PATENT DOCUMENTS

| | | | |
|---|---|---|---|
| 5,236,724 | 8/1993 | Burger | 428/94 |
| 5,346,715 | 9/1994 | Fertel | 426/524 |
| 5,514,395 | 5/1996 | Burger | 426/94 |

*Primary Examiner*—Lien Tran
*Attorney, Agent, or Firm*—Stein, Pendorf & Van Der Wall

[57] ABSTRACT

A process of making a filled bagel dough product and the product formed thereby. One process comprises the steps of mixing and kneading a quantity of bagel dough, including yeast; sealing a filler such as cream cheese within a bagel dough shell; proofing the product, steaming the product, and browning the product, with the product optionally being frozen after either of the steaming or browning steps. The process is preferably used to produce a novel relatively large (half pound) platelet shaped filled bagel dough product, preferably with toppings.

19 Claims, 3 Drawing Sheets

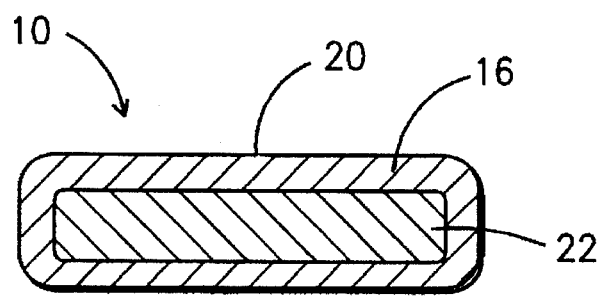
*Fig. 4*
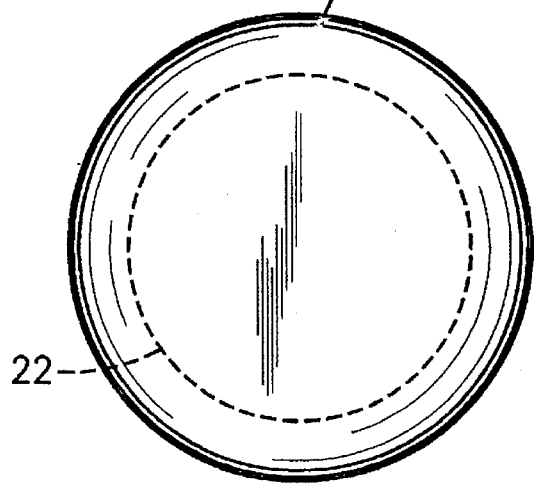
*Fig. 5*
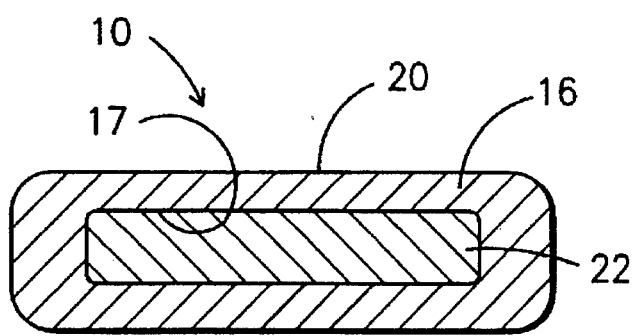
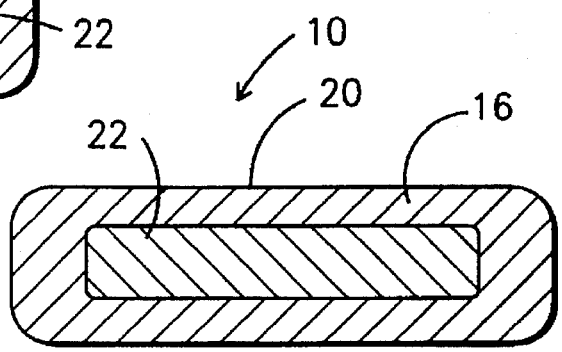
*Fig. 6*
*Fig. 7*

PROCESS FOR PREPARING A FILLED STEAMED BAGEL PRODUCT

REFERENCE TO RELATED APPLICATIONS

This Application is a continuation in part of application Ser. No. 08/106,763 filed Aug. 16, 1993 now U.S. Pat. No. 5,514,395, entitled "Filled Bagel Dough Product and Method", which was a continuation in part of application Ser. No. 07/816,010 filed Dec. 31, 1991, entitled "Filled Bagel Dough Product and Method", which issued as U. S. Pat. No. 5,236,724.

BACKGROUND OF THE INVENTION

1. Field of the Invention

The present invention relates to a unique food product comprising a bagel shell with materials conventionally used as bagel toppings, such as natural or imitation cream, enclosed within the shell. The product provides enjoyment of the distinctive bagel and cream cheese taste, with no requirement for cutting or spreading cheese. The product may be frozen either prior to or after steaming. Steaming a chilled cream cheese filled bagel dough product acts chemically to modify the cream cheese to allow it to be frozen, together with the bagel shell, so that the texture of the cream cheese, upon reheating, is substantially the same as if it had never been frozen. The invention further relates to methods for the production of the filled bagel product.

2. Discussion of the Related art

Bagels are a toroidally shaped bakery product having a hard outer crust and soft inner crumb portion which combine to provide a distinctive "bagel" taste and feel. Traditionally, the dough is worked on a flour board and set in a warm place to rise, then kneaded again before being formed into rings. The rings are formed from balls of risen dough, either by poking a hole through the center of each ball or by rolling each ball into a long strip, shaping the strip into a ring, and then pressing the ends together.

An important step in the traditional bagel making process is boiling the yeast dough in water in order to close the pores of the dough to form a skin. Boiling is followed by baking in a hot oven to turn the crust golden brown.

A favorite way of enjoying bagels is to slice them in half, and spread a topping, such as cream cheese, on the cut surfaces. Bagels are characteristically cut open by slicing them across their width on a plane perpendicular to the axis of the toroid, and the topping is then spread on them. Because of the hard crust, the cutting process requires a sharp knife which can be hazardous. Further, due to the soft crumb interior, a slightly dull knife will crush the hard crust into the soft crumb interior, compacting the interior, which detracts from appearance and taste. Moreover, such planar cut is typically awkward and does not result in two planar halves. Spreading the cream cheese on the bagel may also be tedious as the cream cheese is stored in a refrigerator and is very viscous until it warms.

It is known to include certain flavorings or fillers on or in bagel dough, such as unions, poppy seeds, salt, or raisins. These are materials which have substantially the same handling characteristics as bagel dough: they can withstand the heat of cooking, and are relatively stable at room temperature for extended periods of time. These materials are not what one would consider a "topping".

Although bagels and cream cheese go together during consumption, bagels and cream cheese are very different chemically, and have different storage and handling requirements. Cream cheese is perishable, thermally sensitive, and easily contaminated, and is thus conventionally maintained in a chilled state until use. Cream cheese can not be frozen and thawed without separation of liquids and solids, nor can it be left exposed to air at room temperature for extended periods, nor can it be subject to the high temperatures at which bagel dough is cooked. Thus, for reasons of product preparation as well as for reasons of food storage and handling, it would be counter-intuitive to incorporate cream cheese into a bagel dough shell.

U.S. Pat. No. 5,236,724 entitled "Filled Bagel Dough Product and Method" which issued to the present inventor was first to describe a technique by which cream cheese could actually be incorporated into a bagel dough shell. However, the filled bagel dough product is disclosed as being in the shape of a ball. A ball-shaped product has inherent limitations, both in the cooking process and in the consumption process. A bagel dough ball product, while having advantages of being compact, relatively stable at room temperature, and easy to handle, is necessarily limited in size, since a cream cheese filled bagel ball, if too large, can not be easily eaten by a consumer. Further, a sphere has a minimal outer surface area and a dome shaped upper surface area. These two factors make it rather difficult to provide toppings on a bagel ball.

While there is no suggestion for the production of a filled bagel product in a shape other than a ball, the present inventor undertook to modify the shape, and discovered that there are significant problems with the handing of a raw bagel dough article filled with cream cheese. These problems included the problem of stretching the bagel dough shell until the shell was too thin or ruptured, and the problem of joining a first bagel dough surface to a second bagel dough surface after one or both surfaces had been contacted by cream cheese.

There is thus a need for a filled bagel dough product which represents an improvement over the bagel ball. There is also a need for methods for the production of such improved products.

SUMMARY OF THE INVENTION

It is an object of the present invention a cream cheese-filled bagel dough product which provides enjoyment of the distinctive bagel and cream cheese taste, with no requirement for cutting or spreading the cheese. It is a further object of the invention to provide a cream cheese-filled bagel dough product which can be stored for long periods of time in a freezer.

It is yet a further object of the invention to provide a bagel dough product which has the shape and feel of a conventional torroidal bagel, yet which is provided with a cream cheese filling.

It is yet a further object of the invention to provide a bagel product in a shape which has advantages over a bagel ball.

Despite the apparent technical contradictions between the bagel preparation process and the cream cheese handling requirements, the present inventor discovered that a filled bagel dough product can be produced by a method comprising sealing a quantity of cream cheese within a quantity of bagel dough to form a shaped, filled bagel dough article (such as a toroid or a platelet), proofing the shaped product, and then (1) chilling the proofed, shaped product to reduce the filler core temperature, steaming the chilled product, freezing the product for long term storage, and subsequently baking or browning for approximately 5 minutes to form an appetizing crust; or (2) chilling the shaped, proofed product, steaming the chilled product, again chilling the product to reduce the temperature of the filler, and baking or browning the product.

In the case of forming the torroidal bagel product, the filled shape can be produced by any suitable technique such as co-extrusion, forming by hand, or by laminating an upper hemispherical bagel shell to a cream cheese filled lower hemispherical bagel shell.

In the case of forming a platelet shaped product, the filled shape can be produced by any suitable technique such as forming a filled ball or other shape and compressing the shape, preferably to a greater extent centrally than peripherally, to form a platelet, or by a laminating process wherein cream cheese is deposited onto a lower bagel shell layer, an upper shell layer is superposed and laminated to the lower bagel shell layer to seal cream cheese between the upper and lower layers, and if necessary, cutting or trimming the filled product to any desired pattern or shape.

The step of steaming prior to cooking forms an external and an internal skin, sets the yeast, and forms a wet crust. That is, as the cheese inside the product gets hot it gives off steam which steams the inside wall of the bagel product.

Surprisingly, the product of the invention can be freezer stored, where traditional solid cream cheese could not be freezer stored because the uncooked cream cheese curdles. Steaming a chilled cream cheese filled bagel dough ball after the yeast upon the outside crust of the raised dough has been set acts chemically to modify the cream cheese to allow it to be frozen, together with the bagel shell, so that the texture of the cream cheese, upon reheating, is substantially the same as if it had never been frozen.

Prior to being offered for sale the food product may be fully cooked or may be partially cooked, and may be frozen for long periods of time. The frozen product may be put directly into an oven, and when removed, has the texture and taste of a traditional bagel, except that it is filled with cream cheese.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other filled bread products for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

FIG. 4 is a side sectional view of a platelet.

FIG. 5 is a top view of the platelet FIG. 4.

FIG. 6 is a cross-sectional view of FIG. 4, with the product receiving steam.

FIG. 7 is a cross-sectional view of FIG. 4, with the product receiving heat.

DETAILED DESCRIPTION OF THE INVENTION

Figure 1:
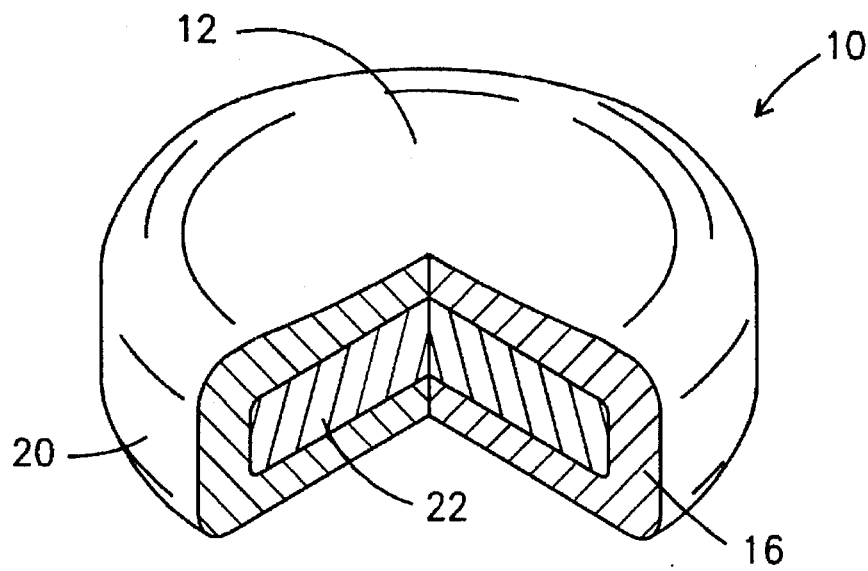
FIG. 1 is a partial cut-away perspective view of the filled bagel dough product formed by an extrusion process.

This product and method is related to the subject of application Ser. No. 08/106,761 and U.S. Pat. No. 5,236,724, the subject matter of which are incorporated herein by reference. Beginning with this technology, upon further experimentation, it was discovered that the shape of the bagel dough product could be modified by taking certain precautions, and that the resulting filled bagel dough products had certain advantages including novel shape, ability to carry toppings, and ease of handling and eating. These advantages are added without any loss of texture or flavor of the product.

The term "cream cheese", as used herein, is intended to refer to any product which can be incorporated in a bagel dough and which gives off sufficient steam in the steaming or baking step of the processes discussed below for forming a skin on the interior surface of the filled bagel dough product. For ease of description the term "cream cheese" is used in the specification, but it is understood that substitutes such as tofu, artificial or imitation cream cheese, marmalade, egg, etc. may be used together with or in place of natural cream cheese.

Preparing bagel dough

Although the present invention is not limited to bagel dough, bagel dough is preferred and the invention will be illustrated with examples using bagel dough. The term "bagel dough" as used herein refers to a very turgid, high protein dough, such as known to make bagels using conventional bagel-making techniques. Such dough is similar to a lean french bread dough, being firm to the touch and easily rolled upon a floured surface. The dough is comprised of a mixture of flour, water, yeast, salt, and, sometimes, sugar. The flour should be a high gluten flour, such as a good clear spring wheat flour with protein content of typically 13.5–14% of flour weight. Water should be added in a quantity of Typically 50–53% of flour weight. Salt content should typically be 1.5–2.2% of flour weight. Yeast should be added in a quantity of typically 0.5–2% of flour weight. Sugar, which serves as a food for the yeast and not as a contributor to the final product, should be a dextrose, corn syrup, high fructose or other fermentable sugar, and can be added up to 4% of flour weight. Residual sugar contributes to the browning of the crust during baking.

Shaping the product

In accordance with the invention, a filled bagel dough product may be produced by a process which may begin with a hollow spherical cup or other shape of stiff, high gluten yeast dough. A quantity of cream cheese is deposited within the cup. The dough edges are brought up and over and sealed around the cream cheese to form a filled ball. This ball forming step may by a manual step or may be a mechanical step as exemplified by, for example, U.S. Pat. Nos. 4,334,464, 4,446,160 and 4,515,819 to Shinriki, wherein a ball-shaped encrusted bakery product is automatically formed by depositing a ball of sticky edible paste material (e.g. jam) onto a starch film. Thereafter, a dough sheet is gathered around the ball to enclose it with dough before cooking The shell may also be filled using a coextruson process as well know in the bakery product art. For example, U.S. Pat.

No. 4,251,201 to Krysiak illustrates an apparatus for the preparation of a filled pretzel. Such filled shapes are also within the contemplation of the invention. Further, U.S. Pat. No. 4,882,185 to Hayashi, a vertical tubular extrusion of bread dough crust material and jam or cream core material is cut and formed into two-layered balls without exposure of the core material. Other methods of production of filled dough products are described in U.S. Pat. Nos. 4,794,009 and 4,882,185.

The filled ball is then cooked.

Figure 8:
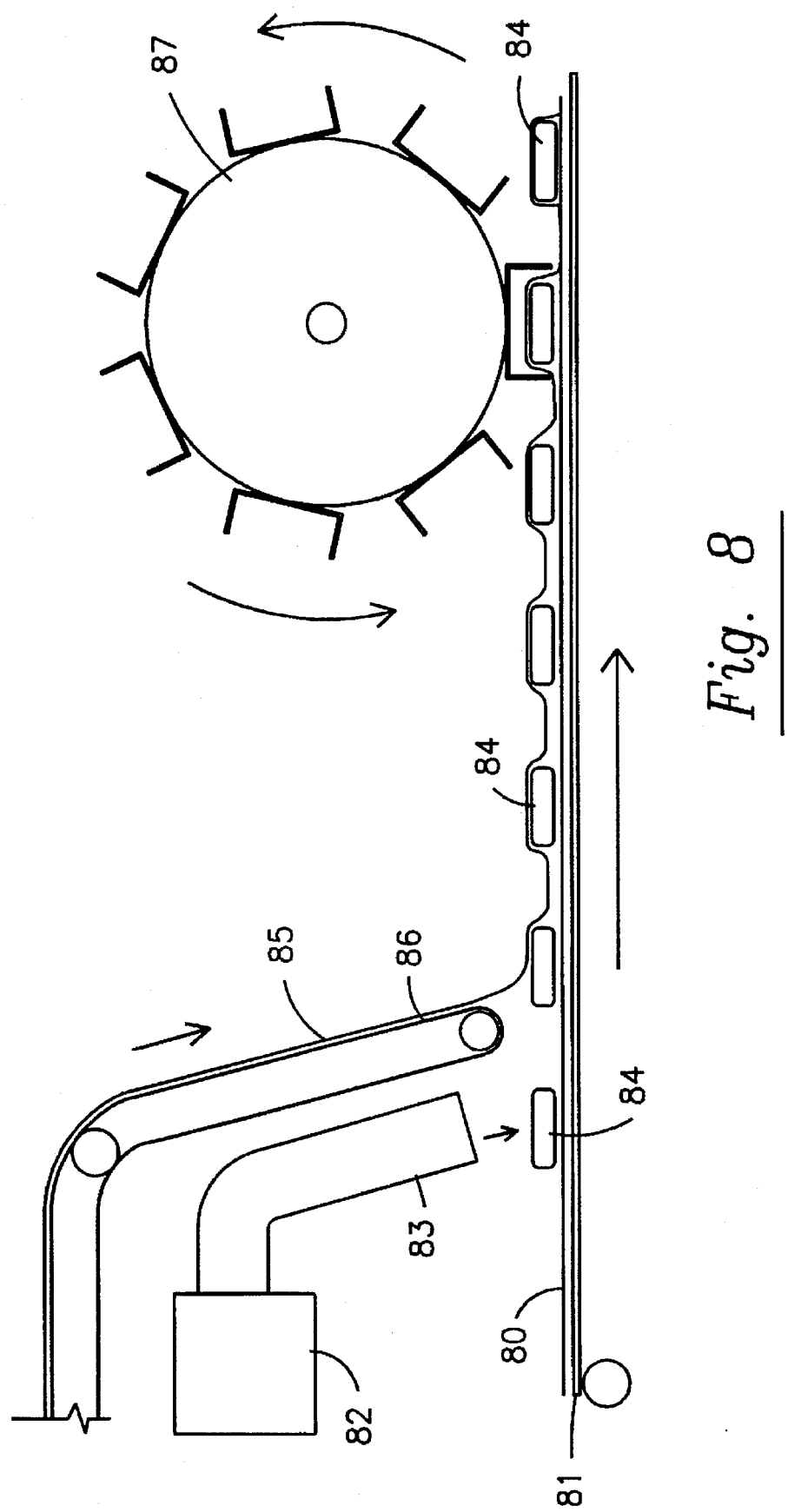
FIG. 8 is a schematic diagram showing the automated production of a cream cheese filled bagel dough product in a lamination process.

The preferred form of the filled bagel dough product of the present invention, shown in FIG. 1, may be made by hand or may be made in an automated fashion, using suitable machinery, such as shown in FIG. 8.

As shown in FIG. 1, the filled bagel dough product 10 is platelet shaped, possibly having a shallow recess 12 inside the edges. The finished bagel product 10 is a steamed and browned bagel dough product having an outer crust 20 and an inner crumb 16 which surrounds a disk shape of cream cheese 22.

Figures 2A, 2B:
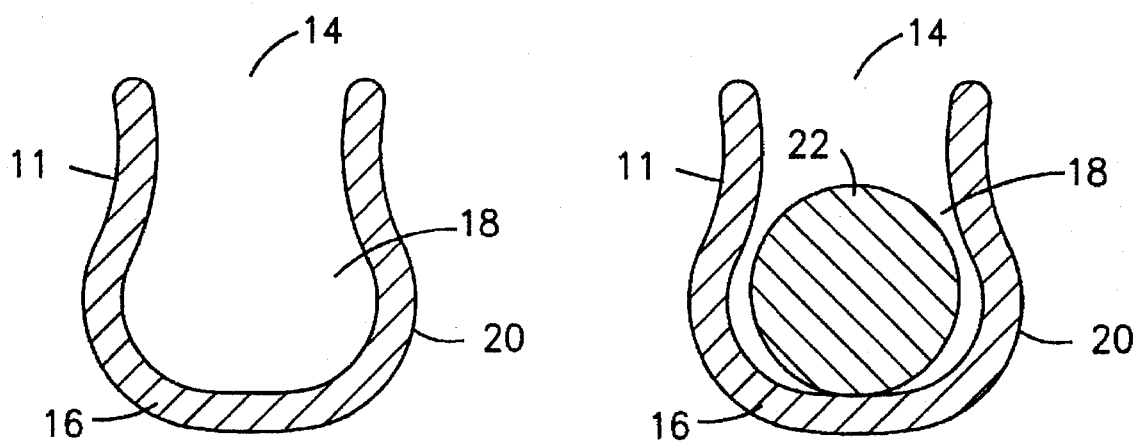
FIG. 2a is a side view of the open-ended hollow bagel dough ball before insertion of the filling.
FIG. 2b is a side view of the open-ended hollow bagel dough ball with the cream cheese filling placed within the hollow.

The invention also pertains to ball shaped bagels, and to products using ball shaped bagels as intermediate shapes in the forming of the final products. As shown in FIG. 2a, after the bagel dough is mixed and kneaded to develop the gluten, it is shaped into a cup 11, open on one end 14, exposing a hollow 18.

Figure 3:
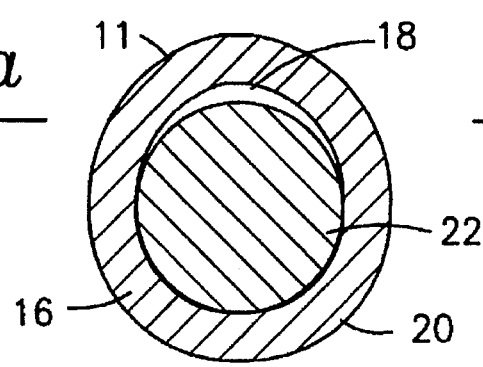
FIG. 3 shows a filled bagel ball prior to deformation.

As illustrated in FIG. 2b, a scoop of cream cheese 22, such as PHILADELPHIA BRAND (™) at about 40°–60° F. is inserted into the hollow 18 through the open end 14. The open end 14 is then closed to hermetically seal the cream cheese 22 within the dough ball 11 as shown in FIG. 3. The round sealed ball 11 may be about the size of a nickel prior to proofing. Such a starting product will form a food product approximately the size of a golf ball following proofing and steaming. The size of the food product may vary depending upon intended use. In one form, the final food product may be the size of popcorn, and may be consumed in a single bite. In the case that the food product is the size of a golf ball, two or more bites may be sufficient to ingest the food product.

In the case of platelet shaped food products as discussed below, the product may also be rather large, such as ½ to 1 lb., in which case a single food product may serve as a meal, and may be sliced in the manner of a pizza prior to consumption.

The dough ball 11 as shown in FIG. 3 may then be subject to a further forming step. It may be flattened to form a platelet as shown in FIG. 1.

The process for forming the shaped bagel products according to the invention may be as varied as the products themselves. The products may be in any of a variety of shapes and sizes. The product may be elongated, circular, diamond shaped, hexagonal, or even in the shape of a pretzel. The product may be anywhere from about ½ oz. to about ½ lb., and from about ½ inch in diameter to about 8 inches in diameter. The product after proofing is most preferably from 1 to 3 inches thick and from 2 to 6 inches in diameter and from 3 ounces to 1 pound in weight after proofing, more preferably from 6 to 10 ounces.

Proofing

The filled bagel product is then placed to proof within a warm cabinet or unheated oven for 25–90 minutes, preferably 45–60 minutes at approximately 80°–120° F., preferably 90°–110° F. which permits the yeast to raise the dough.

Chilling

Subsequent to proofing, the product should be chilled before steaming. Chilling provides the cream cheese with a cool internal temperature which protects the cream cheese during steaming, i.e., the chilling step should cool the internal cream cheese enough to prevent denaturalization of the cream during steaming, while effectively pasteurizing the cream cheese and giving the cream cheese freezable characteristics as discussed above.

The product 10 is chilled until the cream cheese 22 is about 40°–50° F. This step prevents the cream cheese 22 from becoming denaturalized by the heat of the steaming process, thus, preserving texture and taste.

Steaming

The filled, shaped, proofed and chilled bagel dough product may be steamed for approximately 3–10 minutes, preferably about 5 minutes, in a cooking step to provide a wet crust.

As shown in FIG. 6, the product 10 is placed in a steamer preferably for about 5 minutes to enable the hot steam 26 to set the yeast of the crust 20 sufficiently to skin the outside crust 20. The cream cheese 22 contributes to this step as it provides steam within the bagel shell which causes the inner surface of the bagel product 10 to form a skin 17. During this steaming step the product 10 may be supported by a hollow mold, preferably of a porous material, to maintain its shape.

The step of steaming the cheese-filled dough ball acts chemically to modify the cream cheese and enable the cheese to be frozen, together with the bagel shell, so that the texture of the cheese, upon reheating, is the same as if it had never been frozen. Thus, not only does the process of the invention provide a novel bakery product that provides both bagel and cream cheese in a conveniently packaged, prepared combination, but it enables lengthening of the cream cheese shelf-life over what would normally be available for separately sold bagels and cream cheese.

Chilling

Prior to placing in an oven, the product should be slightly chilled. Chilling the product after the outside had been set by steaming is necessary to cool the cream cheese filling enough to prevent denaturalization of the cream during baking, while effectively pasteurizing the cream cheese and giving the cream cheese freezable characteristics as discussed above.

The product 10 is chilled until the cream cheese 22 is about 40°–50° F. This step prevents the cream cheese 22 from becoming denaturalized by the heat of the baking process, thus, keeping its texture and taste.

Egg wash

The product 10 may be glazed with egg wash prior to the baking step and may be filled with other products, such as poppy seeds, onion, etc., to enhance the flavor and to accommodate the tastes and specific desires of individual consumers.

Toppings

At any time subsequent to proofing, toppings such as cheese, tomatoes, spinach, etc. may be applied to the top of the bagel dough product, particularly the platelet shaped product. Topping prior to baking results in the topping being more firmly adhered to the bagel product, which facilitates handling, transporting, packaging, and consumption.

Impinger Conveyor Oven

The steamed and then chilled product may next be placed in an oven for approximately 1–10 minutes, preferably about 2 minutes, of browning (depending upon temperature, type oven, and size of filled product).

As shown in FIG. 7, the product 10 is browned through applied heat 28 in an impinger conveyor oven (similar to a commercial pizza oven) for approximately 2 minutes.

The yeast is most likely fully deactivated prior to the browning step, but any remaining active yeast may continue to ferment within the crumb 16 for a short period to reduce the size of gas cells in the annular interior of the baked product 10. The finished dough texture becomes compacted, since the crusts 16, 17 have already been set during the steaming step.

It is yet a further surprising discovery that a filled bagel product prepared in accordance with the present invention may be baked for an extended period of time to produce a product with a low moisture content, providing a non-traditional bagel dough product which can be stored for long periods without freezing or refrigeration. This dried product is an ideal snack food.

Blast Freezer

The product 10 may be frozen at any time after proofing and steaming, but for the convenience of the consumer, is preferably frozen after the browning step. The product may be stored in a freezer for up to one year without deterioration, or up to one month in a refrigerator without deterioration.

The inventive process produces freezable cream cheese 22 which ordinarily would curdle if frozen, or from which liquids would separate from solids during thawing. The steaming step, as shown in FIG. 6, acts chemically to enable the cream cheese 22 to be frozen, together with the bagel shell. Further, upon reheating within the bagel shell, the cream cheese 22 is restored to its original texture and flavor. Thus, the product 10 not only provides a freezable, cream cheese 22 filled bagel product which, upon reheating, is extremely tasty and provides the same enjoyment as conventional heated bagels which are cut open and filled with cream cheese, the product 10 also allows the lengthening of the shelf-life of the cream cheese 22 through allowing it to be frozen. The one year period of storage far exceeds the storage capability of separately sold conventional bagels and cream cheese.

Packaging

Any conventional packaging process may be used.

Consumption

The resulting product is a cream cheese-filled bagel dough product which can be defrosted or heated to provide enjoyment of the distinctive bagel and cream cheese taste, with no requirement for cutting or spreading the cheese. The process of the invention enables the steamed product to be frozen, including the cream cheese, for extended periods with no deterioration in quality.

The proofed, steamed product is sold to consumers in a frozen state, and may be thawed, micro-waved or, preferably, baked or browned by the consumer prior to consumption. The product need not be thawed prior to baking, and may be microwaved or baked while still frozen. The thawed or frozen product is placed in a hot oven for approximately 1–10, preferably about 2 minutes, of browning (the time varying according to the mass of the individual products). During browning the steam given off by the filling steams and forms a skin on the inside of the shell. The resulting product is a creamcheese-filled bagel dough product which provides enjoyment of the distinctive bagel and cream cheese taste, with no requirement for cutting or spreading the cheese.

In an alternative embodiment of the invention, the product may be proofed and frozen prior to steaming, and may be steamed subsequent to prolonged storage.

Further, the product may even be grilled in much the same way that a grilled cheese sandwich is prepared. Such a product is crunchy outside, warm and soft inside, low-fat, and can be sold directly to the consumer in much the same way that slices of pizza are currently being sold.

In yet a further embodiment, the filled balls or other shapes may be baked to the point that the bagel shell and cream cheese are dehydrated, forming a dry product which may be stored without requiring freezing. This dried product has a crunchy mouth-feel and can compete with potato chips, nachos, etc.

The product may have been baked or browned prior to being frozen and sold to the consumer, or may have been frozen without baking or with only partial baking.

In the case that the product is frozen without having been baked, the frozen or thawed composite is placed in a heated oven by the consumer, and during baking the steam given off by the filling steams and forms a skin on the inside of the shell. In the case that the product is browned or partially baked prior to freezing and selling to the consumer, the filling in the filled bagel product gives of steam during the baking process, which forms a skin in the inside wall of the bagel dough shell. This skin allows for cold storage of the composite, and for secondary baking by the consumer to further form a crust on the outside of the shell.

Thus, not only does the process provide a novel bakery product that provides both bagel and cream cheese in a conveniently packaged, prepared combination, but it enables lengthening of the cream cheese shelf-life over what would normally be available for separately sold bagels and cream cheese.

Variations

Another option is to take the filled bagel product after the chilling step, and before the baking step, and frying and then dipping the product in sugar to make a confectionery type of bagel.

The filled dough product, in addition to being filled with cream cheese, may also be filled with other traditional bagel topping, such as onions, poppy seeds, or lox. The surface may be shined or glazed, if desired, with an egg or other wash.

Lamination process

The invention further includes a process which can be used to produce a platelet shaped filled bagel dough product, and preferably a relatively large (half pound) platelet shaped filled bagel dough product.

In accordance with this process, as shown in FIG. 8, a sheet of bagel dough 80 is conveyed along conveyor belt 81 in the direction from left to right as shown in FIG. 8. A quantity of cream cheese or other filler is deposited from reservoir 82 through outlet 83 onto the lower sheet of bagel dough 80, preferably in the shape of circular paddies about ¼ inch high and 5 inches in diameter. These paddies may be formed by any technique, such as wire cutting of a solidified elongate tubular 5 inch diameter cream cheese feed. As the dough advances further to the right a top sheet or layer of bagel dough 85 is conveyed by conveyor belt 86 and deposited over the lower sheet of bagel dough 80 and filler 84. A drum shaped cookie-cutter type cutting device 87 is used to cut around the perimeter of the filling, and at the same time to laminate the upper and lower sheets of bagel material to each other at the circumferential area of contact. The material around the cut out area is removed, and the cut out laminated products are further processed as discussed above. As the relatively planar shape proofs, it tends to grow upwardly rather than outwardly, so that a 6 inch diameter dough product will rise while proofing but will remain close to 6 inches in diameter.

The advantage of the lamination technique is the ease of forming products of any desired shape, such as squares, hexagons, or decorative ornamental shapes.

The end product for consumption is an approximately 6 inches in diameter, approximately ½ pound novel food item which has all the desirable characteristics described above, and permits toppings to be easily applied and retained to the upper surface, and which further can serve as a snack or meal for one or more people.

In order to permanently adhere the toppings to the upper surface, it is possible to add a quick baking or melting step.

Although the filled bread product was described herein with great detail with respect to an embodiment comprising cream cheese filled in a bagel shell, it will be readily apparent that the combination is capable of use in a number of other applications. Although this invention has been described in its preferred form with a certain of particularity with respect to a cream cheese filled bagel dough product, it is understood that the present disclosure of the preferred form has been made only by way of example and that numerous changes in the details of structures and the composition of the combination may be resorted to without departing from the spirit and scope of the invention.

Now that the invention has been described,

I claim:

1. A process for making a filled bagel dough product, comprising the steps of:
   (A) mixing and kneading flour, salt, yeast and water to form a yeast bagel dough;
   (B) measuring a quantity of cream cheese;
   (C) forming a composite article by forming a shell of said yeast bagel dough of step (A) around and completely enclosing said quantity of cream cheese, said quantity of cream cheese forming a cream cheese filler material core, said bagel shell having an outer surface and an inner surface;
   (D) proofing the product of step (C) to activate said yeast to raise said dough through fermentation;
   (E) chilling said proofed product to cool said filler;
   (F) steaming the chilled product of step (E) to form a steamed product; and
   (G) browning said steamed product in an oven.

2. A process as in claim 1, wherein said cream cheese is a natural cream cheese.

3. A process as in claim 1, wherein said cream cheese is an artificial cream cheese.

4. A process as in claim 3, wherein said artificial cream cheese is a tofu based artificial cream cheese.

5. A process as in claim 1, wherein said dough is comprised of flour having a protein content of 13.5–14% of flour weight, a water content of 50–53%, a salt content of 1.5–2.2% of flour weight, and a yeast content of 0.5–2% of flour weight.

6. A process as in claim 1, wherein said product after proofing is from 1 to 3 inches thick and from 2 to 6 inches in diameter.

7. A process as in claim 1, wherein said product after proofing weighs from 3 ounces to 1 pound.

8. A process as in claim 1, wherein said product after proofing weighs from 6 to 10 ounces.

9. A process as in claim 1, further comprising baking said product to produce a substantially dehydrated product.

10. A process as in claim 1, further comprising a step of chilling the steamed product of step (F) prior to browning.

11. A process as in claim 1, further comprising a step of freezing the product of step (D).

12. A process as in claim 1, further comprising a step of freezing the product of step (G).

13. A process for making a filled bagel dough product, comprising the steps of:
   (A) mixing and kneading flour, salt, yeast and water to form a yeast bagel dough;
   (B) measuring a quantity of cream cheese;
   forming a composite article by forming a shell of said yeast bagel dough of step (A) around and completely enclosing said quantity of cream cheese, said quantity of cream cheese forming a cream cheese filler material core, said bagel shell having an outer surface and an inner surface;
   (D) proofing the product of step (C) to activate said yeast to raise said dough through fermentation;
   (E) chilling said proofed product to cool said filler;
   (F) steaming the chilled product of step (E);
   (G) chilling the steamed product of step (F); and
   (H) browning said steamed product in an oven.

14. A process as in claim 13, wherein said cream cheese is a natural cream cheese.

15. A process as in claim 13, wherein said cream cheese is an artificial cream cheese.

16. A process as in claim 13, wherein said product after proofing is from 1 to 3 inches thick and from 2 to 6 inches in diameter.

17. A process as in claim 13, wherein said product after proofing weighs from 3 ounces to 1 pound.

18. A process as in claim 13, wherein said product after proofing weighs from 6 to 10, ounces.

19. A process for making a filled bagel dough product, comprising the steps of:
   mixing and kneading flour, salt, yeast and water to form a yeast bagel dough;
   forming a first layer of dough from said bagel dough;
   depositing a cream cheese filler material on said first layer of dough;
   forming a second layer of dough from said bagel dough and depositing said second layer over said first layer and filler material;
   pressing said first and second layers together to laminate the first and second layers together in the area adjacent the deposited filler material and to seal said filler material between said first and second layers to form a laminated product;
   proofing said laminated product to activate said yeast to raise said dough through fermentation and to form a proofed product;
   chilling said proofed product to cool said filler; and
   steaming said proofed product.

* * * * *